(12) United States Patent
Samie et al.

(10) Patent No.: US 7,824,292 B2
(45) Date of Patent: Nov. 2, 2010

(54) REAR WHEEL DRIVE AUTOMATIC TRANSMISSION WITH A SELECTABLE ONE-WAY CLUTCH

(75) Inventors: Farzad Samie, Franklin, MI (US); Andrew L. Bartos, Clarkston, MI (US); Chunhao J. Lee, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 283 days.

(21) Appl. No.: 12/177,447

(22) Filed: Jul. 22, 2008

(65) Prior Publication Data

US 2010/0022343 A1  Jan. 28, 2010

(51) Int. Cl.
*F16H 41/00* (2006.01)
(52) U.S. Cl. ...................................... 475/148
(58) Field of Classification Search ................ 74/606 R
See application file for complete search history.

(56) References Cited

U.S. PATENT DOCUMENTS

| | | | |
|---|---|---|---|
| 5,676,026 A | 10/1997 | Tsuboi et al. | |
| 5,829,560 A | 11/1998 | Mainquist et al. | |
| 6,290,044 B1 | 9/2001 | Burgman et al. | |
| 6,712,732 B1 | 3/2004 | Bucknor et al. | |
| 2007/0099758 A1 | 5/2007 | Maguire et al. | |
| 2007/0184933 A1 | 8/2007 | Maguire et al. | |
| 2008/0169165 A1 | 7/2008 | Samie et al. | |
| 2010/0022342 A1* | 1/2010 | Samie et al. ................ | 475/144 |

FOREIGN PATENT DOCUMENTS

JP  8093901 A   4/1996
JP  2003278797 A   10/2003

* cited by examiner

*Primary Examiner*—Dirk Wright
(74) *Attorney, Agent, or Firm*—Quinn Law Group, PLLC

(57) ABSTRACT

A vehicle includes a rear-wheel drive (RWD) automatic transmission having a stationary member, a two-mode selectable one-way clutch (SOWC), pressurized fluid, and a valve body assembly (VBA). The VBA has a piston, a return spring, and an actuator linkage in contact with the piston and a shift lever of the SOWC. Fluid moves the piston and linkage in one direction to lock the SOWC and enable a reverse mode having no spin losses, and the spring moves the piston and linkage in another direction to unlock the SOWC in a forward mode. A method reduces spin losses by admitting fluid into the VBA to move the piston in one direction to thereby rotate the shift lever of the SOWC to one angular position to lock a driving member of the transmission to the stationary member during reverse, engine braking first gear, and manual low speeds.

16 Claims, 3 Drawing Sheets

REAR WHEEL DRIVE AUTOMATIC TRANSMISSION WITH A SELECTABLE ONE-WAY CLUTCH

TECHNICAL FIELD

The present invention relates to a six-speed rear wheel drive (RWD) automatic transmission having a selectable one-way clutch (SOWC) that is selectively engaged in one or more predetermined operating modes.

BACKGROUND OF THE INVENTION

In certain rear wheel drive (RWD) vehicle transmissions, such as in a six-speed RWD automatic transmission of the type known in the art having three gear sets and five torque transmitting elements or clutches, one of the five clutches can be applied in engine braking first gear, manual low, and reverse transmission operating modes. Therefore, such a clutch is referred to functionally as a "low and reverse clutch", and is selectively engaged or disengaged to enable the operating modes listed above. The input member of the low and reverse clutch can also be selectively connected to a conventional one-way clutch in order to selectively prevent relative rotation of members of two of the gear seats of the transmission when engaged.

In all other forward gears, i.e., in second-through-sixth gear in the conventional six-speed RWD automatic transmission mentioned above, reaction torque does not act on the one-way clutch due to the application or engagement of one or more of the four other clutches in the transmission. Consequently, the one-way clutch rotates freely or "freewheels", that is, with relative motion being present between the input and output members of the low and reverse clutch. Moreover, the relative speed of such rotation tends to increase with each successive gear change.

As is known in the art, a disengaged multi-plate clutch can produce drag or spin losses whenever relative motion is present between the input and output members of the multi-plate clutch. The spin losses can in turn reduce fuel economy. As the low and reverse clutch is disengaged in most of the forward gears of the RWD transmission described above, except for engine braking first gear and manual low, and as most of the time such a transmission operates in one of these forward gear ratios, a modest but measurable amount of the spin loss occurs when the low and reverse clutch is disengaged.

SUMMARY OF THE INVENTION

Accordingly, a rear-wheel drive (RWD) vehicle having a six-speed RWD automatic transmission is provided having five torque-transmitting mechanisms or clutches and three gear sets. The transmission has a reverse speed, and the six speeds include five forward high speeds and a first gear speed. First gear in turn includes a manual low speed and an engine braking first gear speed. The transmission includes a valve body assembly (VBA) and a two-mode selectable one-way clutch (SOWC) as one of the five clutches. Within the scope of the invention, the SOWC replaces the low and reverse clutch and the conventional one-way clutch described above, while a conventional VBA is modified to include a SOWC control mechanism adapted to select between the two modes of the SOWC, forward and reverse, in the engine braking first gear, reverse, and in a manual low gear speeds.

When a transmission control algorithm commands or signals a mode change or shift to one of the engine braking first gear, reverse, or manual low gears, pressurized fluid enters the piston bore. The piston moves from the top of the piston bore to the bottom of the piston bore, thus compressing the return spring and simultaneously moving the actuator linkage to the second position. When the transmission algorithm commands or signals a mode change or shift to one of the second-through-sixth gears, and first gear other than manual low and engine braking, pressurized fluid exits the piston bore, and the return spring moves the piston to the top of the piston bore.

The VBA is located below the rotating torque elements of the transmission, and is aligned with and secured to the underside of the transmission case. The control mechanism portion of the VBA includes a bore housing on or within an upper surface of the VBA, with the bore housing defining a piston bore as well as a spring bore. The piston bore contains a hydraulically-actuated piston, the movement of which ultimately moves an interconnected actuator mechanism or linkage which controls the rotational movement of a selector plate within SOWC. The centerline of the piston bore is perpendicular to the axis of rotation of the transmission, and is ideally located in the same plane as the rotational arc of the selector plate of the SOWC, although other planar configurations are also usable within the scope of the invention.

The piston is in continuous contact with or connected to the actuator linkage, which can be configured as a plate, a rod, or any other suitable linkage. The actuator linkage engages the selector plate of the SOWC by retaining or engaging a shift lever that is attached to the selector plate, or that is an appendage thereof. An energy storage device, such as a compression spring or other style of return spring, exerts a return/biasing force on the piston to bias the piston in a first position, with fluid pressure to the VBA moving the piston to a second position. The first position corresponds to a first angular position of the selector plate of the SOWC, which is maintained only during one or more predetermined forward operating modes, i.e., the first-through-sixth gears, other than engine braking first gear and manual low. The second corresponds to a second angular position of the selector plate, which is maintained only during one or more other operating modes, i.e., the engine braking first gear speed, the reverse gear speed, and the manual low gear speed.

A method for reducing spin losses in a six-speed RWD automatic transmission is also provided. The transmission has a SOWC that is controlled via a selection mechanism integrated into the VBA, with the SOWC replacing the conventional low and reverse clutch assembly and one-way clutch. The method includes detecting, sensing, or otherwise determining a shift command signaling a requested shift of the transmission to a reverse, engine braking, or manual low speeds, and admitting pressurized fluid into the VBA described above in response to the shift command. Pressurized fluid moves the piston in one direction, and thus moves the shift lever of the SOWC to lock a driving member of the transmission to a stationary member. In this manner, spin losses in the transmission are reduced in the transmission.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
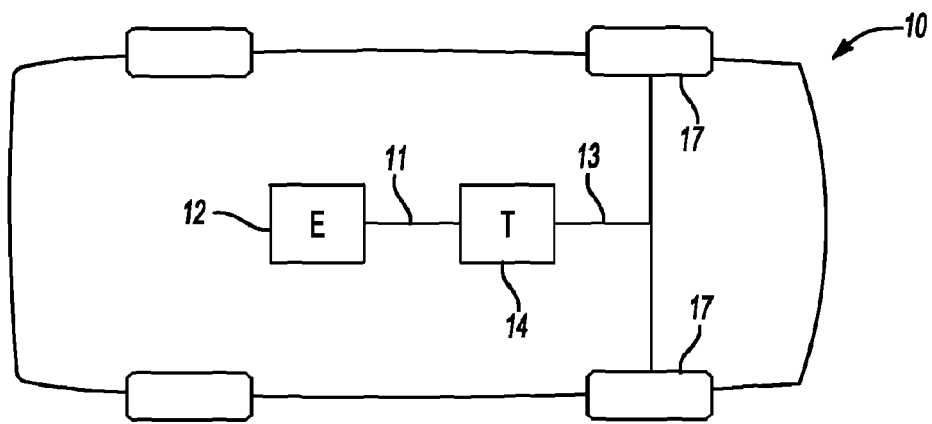
FIG. 1 is schematic illustration of a vehicle in accordance with the invention.

With reference to the Figures, wherein like reference numerals refer to like or similar components throughout the several figures, and beginning with FIG. 1, a vehicle 10 includes an engine (E) 12, such as a gasoline, diesel, or alternative fuel internal combustion engine, although other power sources may be used within the scope of the invention. For example, the engine 12 could be also or alternatively configured as a battery or a fuel cell-powered electric motor, or another alternative power source to the conventional internal combustion engine. The engine 12 is connected to an automatic transmission (T) 14 via an input member or shaft 11. The transmission 14 transmits a rotational force or torque to an output member or shaft 13, which ultimately propels the vehicle 10 via a set of road wheels 17.

Figure 2:
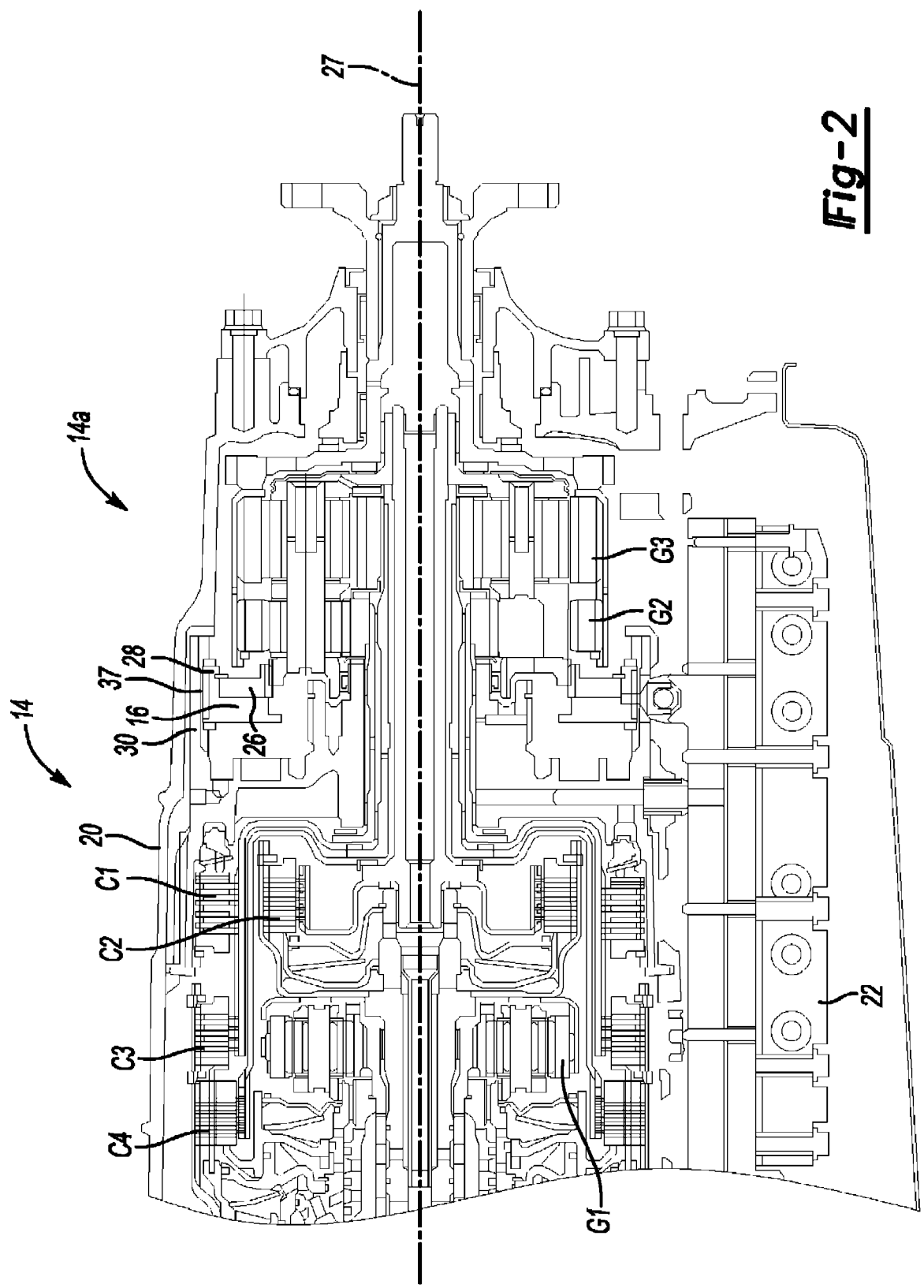
FIG. 2 is a partial cutaway sectional view of an automatic six-speed RWD automatic transmission usable with the vehicle of FIG. 1.

Referring to FIG. 2, the transmission 14 has three gear sets, which are labeled G1, G2, and G3 is FIG. 2 for clarity. The transmission 14 also has five clutches, four of which are labeled C1-C4 for clarity, with the fifth clutch being configured as a two-mode selectable one-way clutch (SOWC) 16. The gear sets G1, G2, and G3 respectively are an input gear set, a front output gear set, and rear output gear set. The gears sets G1-G3, the clutches C1-4, and the SOWC 16 can be selectively engaged and disengaged alone or in various combinations to provide a six-speed rear-wheel drive (RWD) functionality, as will be understood by those of ordinary skill in the art.

The transmission 14 also includes an outer housing or case 20, as well as a valve body assembly (VBA) 22 having an integrated SOWC control mechanism 24, as described in detail below with reference to FIGS. 4 and 5. As used herein, the term "integrated" refers to the relative configuration of the SOWC control mechanism 24 and the VBA 22, with the control mechanism 14 being a portion or integral part of the VBA 22. The control mechanism 24 selectively controls or actuates the SOWC 16 based on one or more predetermined operating modes of the transmission 14, as described below.

As will be understood by those of ordinary skill in the art, a SOWC is similar to a conventional one-way clutch in basic operation. However, depending on the details of the design, a SOWC is also capable of producing a mechanical connection between a given "driving" member, such as an input race or a first coupling plate, to a second independent "driven" member, such as an output race or second coupling plate in one or both rotational directions. Also depending on the design, a SOWC can overrun in one or both directions of rotation. Typically, a SOWC contains a selector ring or plate that when moved to a second or a third position, controls or selects the various operating modes of the SOWC.

The mechanical means used to lock a SOWC such as the SOWC 16 of FIG. 1 are varied and well known. For example, a SOWC may use rollers, sprags, rockers, struts, or another suitable torque-transmitting element, a plurality of which are positioned between the input and output races or members of the SOWC 16. Depending on the particular type or style of SOWC used and the required direction of rotation, each race of the SOWC may contain unique surface features, such as windows or strut wells, each being suitable for engaging one or more of the torque-transmitting elements positioned therein in order to selectively enable various clutch operating modes.

In the transmission 14 of FIG. 2 in particular, the SOWC 16 has an inner race or driving member 26 and an outer race or driven member 28. The driven member 28 is affixed or grounded to the center support 30, such as by engaging a plurality of splines 33 with mating splines 37 in the center support 30. The driving member 26 is connected to the output gear sets G2 and G3, such as but not limited to a carrier member of a planetary gear set. The SOWC 16 can selectively transmit torque between the driving member 26 and the driven member 28 in one rotational direction. Reversing the direction of rotation of the driving member 26 in turn enables the driving member 26 to freewheel with respect to the driven member 28.

The VBA 22 is positioned adjacently to and below the axis or centerline 27 of the SOWC 16 such that fluid pressure admitted to the VBA 22 as explained above moves the shift lever 40 of the SOWC 16 in one direction, ultimately engaging the SOWC 16 in a reverse mode of the two-mode SOWC 16. Discharge of the fluid pressure from the VBA 22 moves the shift lever 40 in another direction, ultimately disengaging the SOWC 16 to enable the forward high operating modes, usable with the first-through-sixth gears of the transmission 14, other than manual low and engine braking first gear speeds. Thus, the SOWC 16 can be engaged in three transmission operating modes: reverse gear speed, manual low gear speed, i.e., when an operator moves a shift lever to the "L" position, and engine braking first gear speed, i.e., which occurs for short time when the shift lever is in the "D" position and the transmission 14 is launching the vehicle 10 of FIG. 1 from a standstill in first gear up to approximately 5 miles per hour.

Figure 3:
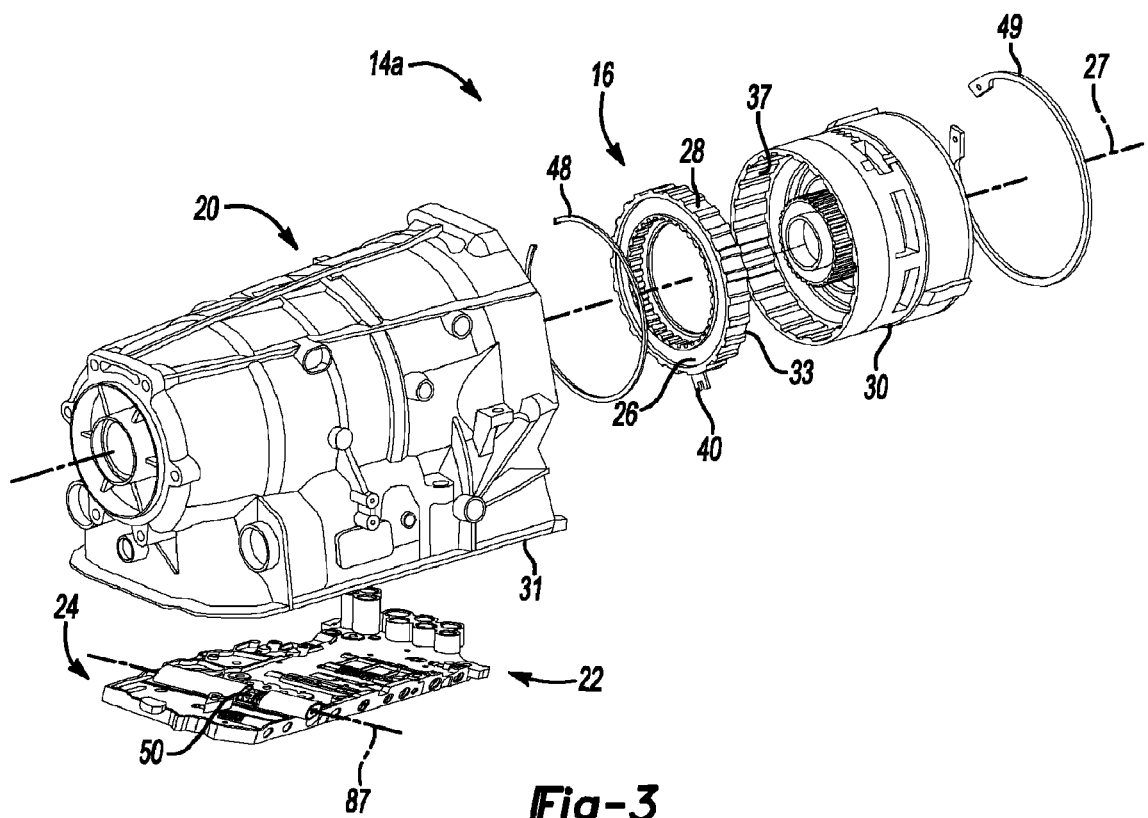
FIG. 3 is a schematic exploded perspective view of the transmission of FIG. 2.

Referring to FIG. 3, an exploded view of a portion 14A of the transmission 14 of FIG. 2 shows the general orientation of the VBA 22, the case 20, and the SOWC 16. The VBA 22 having the control mechanism 24 is positioned adjacently to an underside or bottom surface 31 of the case 20, i.e., below a centerline 27 of the transmission 14, which in one embodiment can be at least partially within a cavity (not shown) defined by the case 20 in order to minimize packaging space. The SOWC 16 is positioned or enclosed by the center support 30 of the transmission 14. The driven member 28 is held stationary, i.e., is grounded or connected to the center support 30, such as by engaging the various splines 33 of the driven member 28 with a plurality of mating splines 37 of the center support 30.

A suitably shaped and/or sized linkage, arm, or shift lever 40 of the SOWC 16 is integrally formed with or directly or indirectly connected to a selector ring or plate (not shown) of the SOWC 16, and extends radially-outward from the SOWC 16 toward the control mechanism 24 of the VBA 22. The shift lever 40 can be configured with a shaped end 44 as described below, such as a fork as shown in FIG. 3, with the shaped end being shaped, sized, or otherwise configured so as to mesh with or engage an actuator linkage 50 within the control mechanism 24. The SOWC 16 may also include a pair of retaining rings 48, 49 for respectively securing the SOWC 16 within the center support 30 within a desired tolerance.

Figure 4:
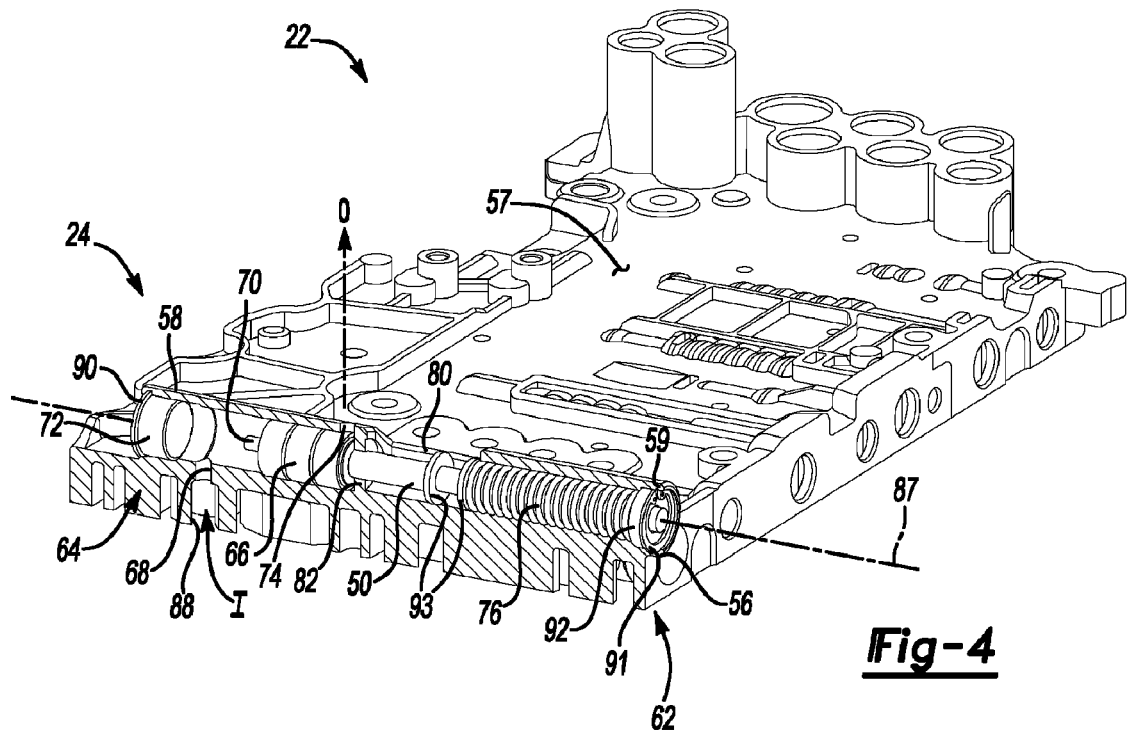
FIG. 4 is a schematic perspective view of a portion of a valve body assembly (VBA) usable with the transmission of FIGS. 2 and 3.

Referring to FIG. 4, a perspective view of the VBA 22 with certain surfaces removed for clarity shows the internal detail of the control mechanism 24. As described above, the control mechanism 24 is an integral portion of the VBA 22, and includes a bore housing 56. The bore housing 56 is formed integrally with, or is otherwise connected to, an upper surface 57 of the VBA 22, with the bore housing 56 having a spring end 62 and a piston end 64 generally describing the separate functional portions or ends of the bore housing 56. At the piston end 64 is a piston bore 58 containing an apply piston 66, and at the spring end 62 is a spring bore 59 containing a return spring 76.

The piston bore 58 is machined to receive the apply piston 66 in a close-fitting but freely movable manner. The piston 66 is selectively actuated in the direction of arrow A by an inlet of pressured fluid, represented in FIG. 4 by the arrow I, through an inlet port 68. Likewise, an exhaust port 74 is provided in the piston bore 58 to allow any trapped fluid to escape, as indicated by the arrow O, thereby preventing the piston 66 from becoming hydraulically locked. A stop feature 70, such as but not limited to a bumper or stop pin, prevents the piston 66 from blocking the flow of hydraulic fluid into the inlet port 68. Within the scope of the invention, a similar feature could also be incorporated into a piston bore plug 72 instead of the piston 66.

Figure 5:
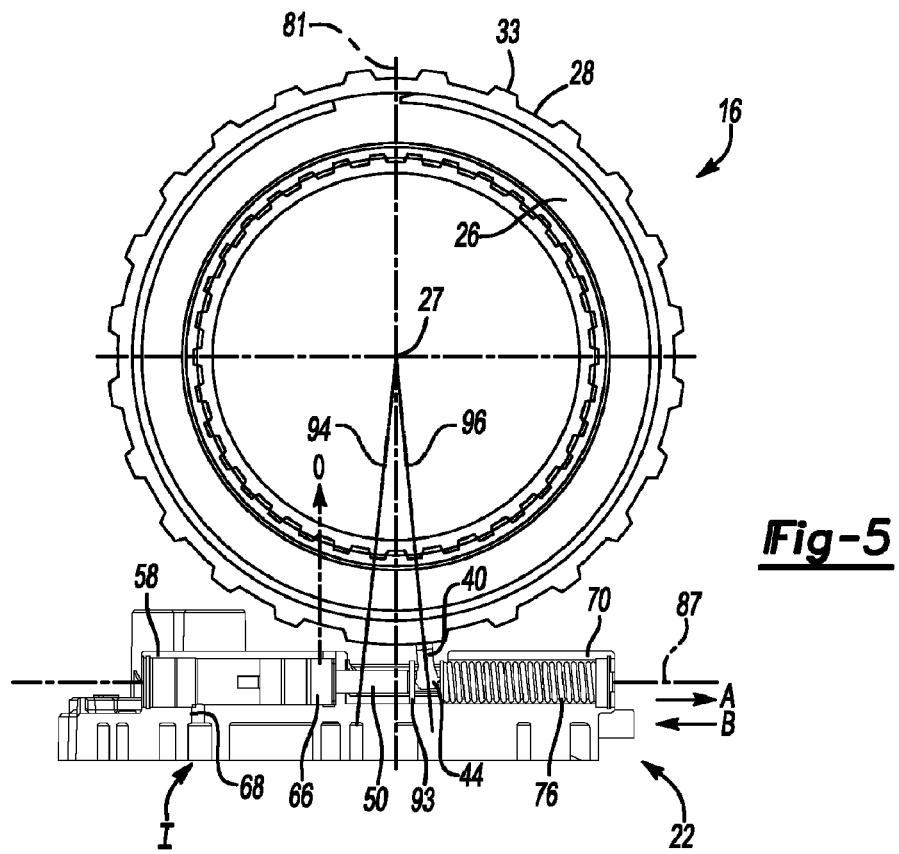
FIG. 5 is a schematic perspective view of an integrated control mechanism usable with the VBA and transmission of FIGS. 2, 3, and 4.

The piston 66 is in direct continuous contact with and/or operatively connected to the actuator linkage 50, which is itself connected to the shift lever 40, and ultimately to the SOWC 16, as shown in FIG. 5 and described below. Due to packaging limitations, the actuator linkage 50, the piston 66, and a return spring 76 can be positioned in different planes, or alternately can be coplanar as shown in FIGS. 3-5. However configured, movement of the piston 66 in the direction of arrow A pushes or moves the actuator linkage 50 in the same direction. When the inlet fluid pressure is discontinued, the return spring 76 within the spring bore 59 pushes or moves the piston 66 in the direction of arrow B (see FIG. 5), a movement that exhausts or discharges fluid through back through the inlet port 68.

The stroke length of the piston 66 is preferably slightly shorter than the chordal length of the total rotational angle of the shift lever 40 (see FIG. 5) at a centerline 87 of the spring bore 59. If the piston stroke is greater than the chordal length, certain components in the SOWC 16 such as the selector plate (not shown) would become the reaction members for the apply force in the direction of arrow A (see FIG. 5) from the piston 66, as well as the return force in the direction of arrow B (see FIG. 5) from the return spring 76. By minimizing the reaction forces transmitted to the SOWC 16, wear is reduced, which potentially prolongs the life of the SOWC 16. Conversely, if the piston stroke was much less than the aforementioned chordal length, the mode changes in the SOWC 16 may not be fully or optimally implemented.

The control mechanism 24 is positioned on the upper surface 57 of the VBA 22, with the centerline 87 of the bore housing 56 in the same plane as the rotational arc of the selector plate (not shown) in the SOWC 16. A window 80 is cast, machined, or otherwise provided in the bore housing 56 and centered on a vertical axis or line 81 (see FIG. 5) of the SOWC 16 that passes through the rotational axis 27 of the SOWC 16 (see FIG. 5). The window 80 serves as a sufficient opening to allow the shift lever 40 (see FIG. 5) of the SOWC 16 to engage or mesh with the actuator linkage 50.

Still referring to FIG. 4, a wall 82 in the piston bore 58 acts as hard stop and thus limits piston travel of the piston 66 when fluid from a fluid control channel 88 and the inlet port 68 is directed into the piston bore 58. The bore plug 72 closes an outboard end of the piston bore 58, and can be secured in place by a plug retaining ring 90. The bore plug 72 can also act as a hard stop to limit piston travel in the outboard direction.

Within the spring bore 59, the return spring 76 is radially-retained, with the return spring 76 being configured as, for example, a helical compression type spring, although other spring designs are usable within the scope of the invention. A retaining ring 91 can be installed in the spring bore 59 behind a support sleeve 92 to act as a first reaction member for the spring force provided by the return spring 76. When using a support sleeve 92, one end of the return spring 76 is in contact with the support sleeve 92, while the other end of the return spring 76 is in contact with one of a pair of collars 93.

The spring force from the return spring 76 urges the piston end 64 of the actuator linkage 50 into direct continuous contact with the piston 66. The actuator linkage 50 and the piston 66 both move in the bore housing 56 until the stop feature 70 contacts the bore plug 72. Since the shaped end 44 of the shift lever 40 (see FIG. 5) is engagingly restrained between the pair of collars 93, the selector plate (not shown) of the SOWC 16 is held in the first angular position 94 (see FIG. 5). The plug retaining ring 90 is the second reaction member for the spring force. Because the piston 66 is a separate part from the actuator linkage 50, it is isolated from any couple or radial force generated in the latter. This reduces wear or scuffing between the piston 66 and the piston bore 58, and thus minimizes the risk of any of the parts binding in the bore housing 56.

Referring to FIGS. 4 and 5 together, when a mode change is required of the SOWC 16, and in particular when the SOWC 16 is to be applied or engaged, pressurized fluid from a transmission pump (not shown) or a dedicated pump is directed into the fluid control channel 88, and then enters the piston bore 58 through the port 68. As any hydraulic force acting in the direction of arrow A on the piston 66 exceeds a return force provided in the direction of arrow B by the return spring 76, the piston 66 and the actuator linkage 50 move together towards the spring end 62 of the bore housing 56 until the piston 66 contacts the wall 82 at the bottom of the piston bore 58. Because the shaped ends 44 on the shift lever 40 (see FIG. 5) are trapped or positioned between the pair of collars 93, the shift lever 40 and the selector plate (not shown) of the SOWC 16 each rotate around the rotational axis 27 of the SOWC 16 (see FIG. 5) to a second angular position 96, thereby affecting the required mode change or shift in the SOWC 16. Once positioned at the second angular position 96, the SOWC 16 is set or engaged in a reverse mode, wherein no relative motion is possible between the driving member 26 and the driven member 28 (see FIGS. 2, 3, and 5) in either rotational direction.

To return the SOWC 16 to its other mode, i.e., the forward mode, pressurized fluid is exhausted from the fluid control channel 88. As the return force provided by the return spring 76 exceeds that of the exhausting fluid, the piston 66 and the actuator linkage 50 move in the direction of arrow B toward the piston end 64 of the bore housing 56.

Referring to FIG. 5, the bore housing 56 has a centerline 87 in the same plane as the rotational arc of the selector plate (not shown) of the SOWC 16. The first and second angular positions 94 and 96 of the selector plate (not shown) of the SOWC are substantially equidistant from the vertical centerline or axis 81 of the SOWC 16. To facilitate assembly into the case 20 (see FIG. 2), the shift lever 40 and/or the shaped end 44 thereof can be configured so as to be removable from the selector plate (not shown) and the SOWC 16. For example, the shift lever 40 can be inserted into a groove or slot in the selector plate, with the shift lever 40 prevented from moving once secured or retained to the actuator linkage 50.

In this manner, spin losses are reduced in the transmission in the first-through-sixth gear transmission operating modes. Also, the weight and packaging space of the transmission is reduced, as all of the conventional low and reverse clutch components are eliminated, such as a clutch plate assembly, a clutch apply piston, and a clutch return spring. The reverse mode of the SOWC 16 replaces the functionality of the low and reverse clutch, while the forward mode of the SOWC 16 behaves in the same manner as the one-way clutch it replaces.

While the best modes for carrying out the invention have been described in detail, those familiar with the art to which this invention relates will recognize various alternative designs and embodiments for practicing the invention within the scope of the appended claims.

The invention claimed is:

1. A rear wheel drive (RWD) vehicle comprising:
   a six-speed transmission having three gear sets and five clutches, the five clutches including a two-mode selectable one-way clutch (SOWC) having a driving member and a stationary member, wherein the five clutches can be selectively engaged to connect members of the three gear sets to the stationary member to thereby enable a reverse speed and the six speeds of the transmission, the six speeds including: an engine braking first gear speed, a manual low speed, a first gear speed, and five forward high speeds;
   pressurized fluid; and
   a valve body assembly (VBA) having an integrated control mechanism operable for controlling the SOWC to thereby select between the two modes of the SOWC, the integrated control mechanism including:
      a first bore and a second bore, wherein the first bore is in fluid communication with the source of pressurized fluid and has a centerline that is positioned below an axis of rotation of the SOWC;
      an apply piston positioned within the first bore and moveable therein;
      a return spring positioned within the second bore and compressible therein;
      an actuator linkage in continuous contact with the apply piston and the return spring; and
      a shift lever operatively connected to each of the SOWC and the actuator linkage, the shift lever being operable for selecting between the two modes of the SOWC in response to a direction of motion of the apply piston;
   wherein the pressurized fluid moves the apply piston and actuator linkage in one direction to thereby lock the driving member to the stationary member, and to thereby select one of the engine braking first gear speed, the reverse speed, and the manual low speed; and
   wherein the return spring moves the apply piston and the actuator linkage in another direction to unlock the driving member from the stationary member during one of the first gear speed and the five forward high speeds.

2. The vehicle of claim 1, wherein the stationary member is a driven member of the SOWC that is indexed to a stationary case of the transmission.

3. The vehicle of claim 1, wherein the shift lever includes a shaped end adapted to engage the actuator linkage so as to move in conjunction therewith.

4. The vehicle of claim 1, wherein a centerline of the first bore is perpendicular to an axis of rotation of the transmission.

5. The vehicle of claim 1, wherein the apply piston, the return spring, and the actuator linkage are coplanar.

6. The vehicle of claim 1, further comprising a hard stop within the first bore that is adapted to limit the axial travel of the actuator linkage.

7. The vehicle of claim 1, further comprising a pair of collars each operatively connected to the actuator linkage; wherein the shift lever engages the actuator linkage between the pair of collars.

8. The vehicle of claim 1, wherein the VBA is mounted to an underside of the stationary case.

9. A rear wheel drive (RWD) automatic transmission having five clutches and three gear sets providing a reverse speed and six forward speeds including: an engine braking first gear speed, a manual low speed, a different first gear speed, and five forward high speeds, the RWD transmission comprising:
   a center support;
   a two-mode selectable one-way clutch (SOWC) having a driven member indexed to the center support, a rotatable driving member, and a shift lever, the SOWC being one of the five clutches of the transmission; and
   a valve body assembly (VBA) positioned adjacent to and below the center support, the VBA having an integrated control mechanism adapted to select between the two modes of the SOWC, and including:
      a first bore and a second bore, wherein the first bore has a centerline that is positioned below an axis of rotation of the SOWC;
      an apply piston disposed and moveable within the first bore, the apply piston being moveable in a first direction by admitting pressurized fluid into first bore to thereby select a first mode of the SOWC, wherein the first mode locks the driving member to the driven member to allow one of the engine braking first gear speed, the manual low speed, and the reverse speed;
      a return spring disposed and compressible within the second bore, and adapted for biasing the apply piston in a second direction to thereby select a second mode of the SOWC, wherein the second mode allows the driving member to freewheel with respect to the driven member to allow one of the different first gear speed and the five forward high speeds; and
      an actuator linkage in continuous contact with each of the apply piston and the shift lever, the actuator linkage being adapted for moving the shift lever in response to a movement of the apply piston within the first bore.

10. The transmission of claim 9, wherein the shift lever extends radially-outward from the SOWC, and includes a shaped end adapted to engage the actuator linkage so that the shift lever moves in conjunction with the actuator linkage.

11. The transmission of claim 10, wherein the shaped end is configured as a fork, and wherein the actuator linkage includes a pair of collars between which the fork is positioned.

12. The transmission of claim 11, wherein the shift lever is detachable from the SOWC to facilitate assembly of the transmission.

13. The transmission of claim 9, wherein a centerline of the first bore is perpendicular to an axis of rotation of the transmission.

14. A method for reducing spin losses in a six-speed rear-wheel drive (RWD) automatic transmission having a valve body assembly (VBA) including a hydraulic piston operable for moving an actuator linkage, and five torque-transmitting mechanisms including a two-mode selectable one-way clutch (SOWC) with a shift lever, the method comprising:
   positioning the VBA within the transmission such that a centerline of the hydraulic piston is positioned below an axis of rotation of the SOWC;
   determining a shift command signaling a requested shift of the transmission to one of an engine braking first gear speed, a reverse speed, and a manual low speed;
   admitting pressurized fluid into the VBA in response to the shift command to thereby move the hydraulic piston in one direction, and to thereby move the shift lever from a first position to a second position;

wherein movement of the shift lever to the second position locks the driving member to the stationary member.

15. The method of claim 14, further comprising:

determining another shift command signaling a requested shift of the transmission from one of the engine braking first gear speed, the reverse speed, and manual low speed to one of a different first gear speed and a forward high speed; and discharging the fluid from the VBA to thereby move the hydraulic piston in another direction, and to thereby rotate the shift lever to the first position;

wherein the first position unlocks the driving member from the stationary member.

16. The method of claim 15, wherein the transmission includes a center support, and wherein the center support is indexed to a case of the transmission.

\* \* \* \* \*